United States Patent
Bartholomew

Patent Number: 5,566,722
Date of Patent: Oct. 22, 1996

[54] SELF LOCKING SLITTED CORRUGATED TUBING

[75] Inventor: Donald D. Bartholomew, Mt. Clemens, Mich.

[73] Assignee: Proprietary Technology, Inc., Bloomfield Hills, Mich.

[21] Appl. No.: 436,357

[22] PCT Filed: Nov. 17, 1992

[86] PCT No.: PCT/US92/09994

§ 371 Date: May 16, 1995

§ 102(e) Date: May 16, 1995

[87] PCT Pub. No.: WO94/11663

PCT Pub. Date: May 26, 1994

[51] Int. Cl.$^6$ ............. F16L 9/00; B29B 15/00; B29C 49/00

[52] U.S. Cl. ............. 138/166; 138/121; 138/128; 138/169; 425/539

[58] Field of Search ............. 138/166, 121, 138/128, 151, 169, 170, 173; 425/539, 527, 531, 541; 204/566

[56] References Cited

U.S. PATENT DOCUMENTS

| | | | |
|---|---|---|---|
| 657,992 | 9/1900 | Smith | 138/166 |
| 955,153 | 4/1910 | Graham | 138/166 |
| 1,340,703 | 5/1920 | Dech | 138/128 |
| 1,895,133 | 1/1933 | Quarnstrom . | |
| 1,971,928 | 8/1934 | Zallea . | |
| 2,067,665 | 1/1937 | Holt . | |
| 2,299,520 | 10/1942 | Yant . | |
| 2,354,485 | 7/1944 | Slaughter . | |
| 2,663,324 | 12/1953 | Fentress . | |
| 2,756,172 | 7/1956 | Kidd . | |
| 2,990,309 | 6/1961 | Wahl et al. | 138/128 |
| 3,038,205 | 6/1962 | Plummer | 138/128 |
| 3,208,478 | 9/1965 | Baines . | |
| 3,336,950 | 8/1967 | Fochler . | |
| 3,517,702 | 6/1970 | Mueller et al. | 138/128 |
| 3,625,259 | 12/1971 | Kennedy, Jr. . | |
| 3,656,514 | 4/1972 | Kafka | 138/166 |
| 3,747,352 | 7/1973 | Maroschak | 138/173 |
| 3,846,575 | 11/1974 | Troy | 138/128 |
| 3,859,025 | 1/1975 | Maroschak . | |
| 3,870,774 | 3/1975 | Maroschak . | |
| 4,037,626 | 7/1977 | Roberts, Jr. | 138/109 |
| 4,214,147 | 7/1980 | Kraver . | |
| 4,422,478 | 12/1983 | Pentney et al. | 138/168 |
| 4,509,911 | 4/1985 | Rosenbaum . | |
| 4,513,787 | 4/1985 | Hegler et al. | 138/166 |
| 4,647,715 | 3/1987 | Butler . | |
| 4,667,702 | 5/1987 | Roth | 138/162 |
| 4,714,280 | 12/1987 | Winterhoff . | |
| 4,766,662 | 8/1988 | Bradshaw et al. . | |
| 4,789,322 | 12/1988 | Chan et al. . | |
| 4,838,318 | 6/1989 | Karakawa . | |
| 4,865,890 | 9/1989 | Erlichman . | |
| 4,877,224 | 10/1989 | Watts . | |
| 4,944,976 | 7/1990 | Plummer, III . | |
| 5,059,109 | 10/1991 | Dickut et al. . | |

Primary Examiner—David Scherbel
Assistant Examiner—James F. Hook
Attorney, Agent, or Firm—Harness, Dickey & Pierce, P.L.C.

[57] ABSTRACT

The present invention relates to corrugated protective sleeves (10) and for enclosing lengths of conducting equipment, such as cables, wiring and tubing, and more particularly to corrugated sleeves (10) and formed of a single piece of plastic. The corrugated protective sleeve includes an inner surface (14) and an outer surface (20) which is slit open to form male (36) and female (26) locking members which are adjoined once the conducting equipment has been inserted therein. Various methods for providing the locking areas as a part of the corrugated tubing are shown.

30 Claims, 5 Drawing Sheets

SELF LOCKING SLITTED CORRUGATED TUBING

BACKGROUND OF THE INVENTION

1. Field of the Invention

The invention relates to a corrugated protective sleeve for enclosing lengths of conducting equipment, such as cables, wiring and tubing, and more particularly, to a corrugated plastic sleeve adapted to have male and female locking members located along first and second longitudinal edges which allow the corrugated plastic sleeve to be closed upon fully inserting the male member within the corresponding female member.

2. Description of Related Art

Many protective tubular enclosures having longitudinal points of attachment are known. Generally, the tubular enclosures include sheets of material wrapped around elongated objects such as wiring, cables or other forms of tubing which are closed along the longitudinal edges to provide a sealed environment for the object or objects contained therein. For example, U.S. Pat. No. 1,895,133 which issued to Quarnstrom on Jan. 23, 1993; U.S. Pat. No. 2,067,665 which issued to Holt on Jan. 12, 1937; U.S. Pat. No. 3,625,259 which issued to Kennedy on Dec. 7, 1971; and U.S. Pat. No. 4,944,976 which issued to Plummer on Jul. 31, 1990 all disclose various designs of tubular enclosures, however, none of the aforementioned patents disclose the use of corrugated tubing having male and female locking members. Furthermore, the known patents which disclose corrugated tubular enclosures such as U.S. Pat. No. 4,513,787 do not disclose tab and detent locking between with the male and the male locking member.

Accordingly, it is the primary object of the present invention to provide a corrugated protective sleeve which is capable of enclosing relatively long lengths of conducting devices.

It is another object of the present invention to provide a one-piece corrugated protective sleeve which is selectively openable and closeable.

It is another object of the present invention to provide a corrugated tube which is closeable and may be permanently sealed.

It is another object of the present invention to provide a corrugated protective sleeve which is readily producible at a relatively low cost.

It is yet another object of the present invention to provide a simple and inexpensive method of producing the corrugated tubing of the present invention.

SUMMARY OF THE INVENTION

To achieve the foregoing objects, the present invention provides a corrugated protective sleeve assembly made by blow molding plastic. The corrugated sleeve generally comprises a single piece of corrugated plastic having a longitudinal body with alternating, enlarged and reduced diameter portions, and an inner surface and an outer surface, wherein the outer surface contains a plurality of projecting members which serve to lock the tube together about first and second longitudinal edges.

The corrugated sleeve of the present invention is formed by extruding a single length of relatively round plastic tubing between a plurality of first and second moving mold plates arranged along a linear path and adjoining the mold plates for a specific amount of time. A longitudinal cavity having sections of successive enlarged and reduced diameter is provided when the first and second mold plates are adjoined along their mating faces. The first plurality of mold plates are provided with a male locking portion located below the level of the mold plates face that contacts a second plurality of mold plates. The second mold plates include a portion of mold cavities which contain a plurality of female mating lug and recess portions, respectively, disposed perpendicularly to the second plate's face.

The plastic tubing is then blow molded such that the plastic flows within the mold plates and becomes contoured according to the dimensions of the mold plates. The enlarged and reduced diameter portions are formed and the male and female parts of the locking portions become filled by displaced plastic to form the outward projections contained on the outer surface of the corrugated sleeve.

The corrugated protective sleeve is adapted to have first and second longitudinal edges by slitting the corrugated plastic sleeve along a longitudinal line which is substantially parallel to the tubes central axis. The protective sleeve is made of a relatively deformable plastic which allows for deformation of the corrugated sleeve without damaging the contents contained within the sleeve. A plurality of the corrugated sections contain outwardly projecting tab members which are referred to herein as male locking members. Female locking members extend outwardly from the body portion and are formed upon slitting the sleeve along the longitudinal axis. Typically, a corresponding number of the female locking members are provided with a detent or aperture into which the tab portions of the corresponding male locking member projects to reduce the likelihood of an undesired disconnection between the male and female locking members.

Additional objects and advantages of the present invention will become apparent from a reading of the detailed description of the preferred embodiment which make reference to the following set of drawings in which:

BRIEF DESCRIPTION OF THE PREFERRED EMBODIMENT

Figure 1:
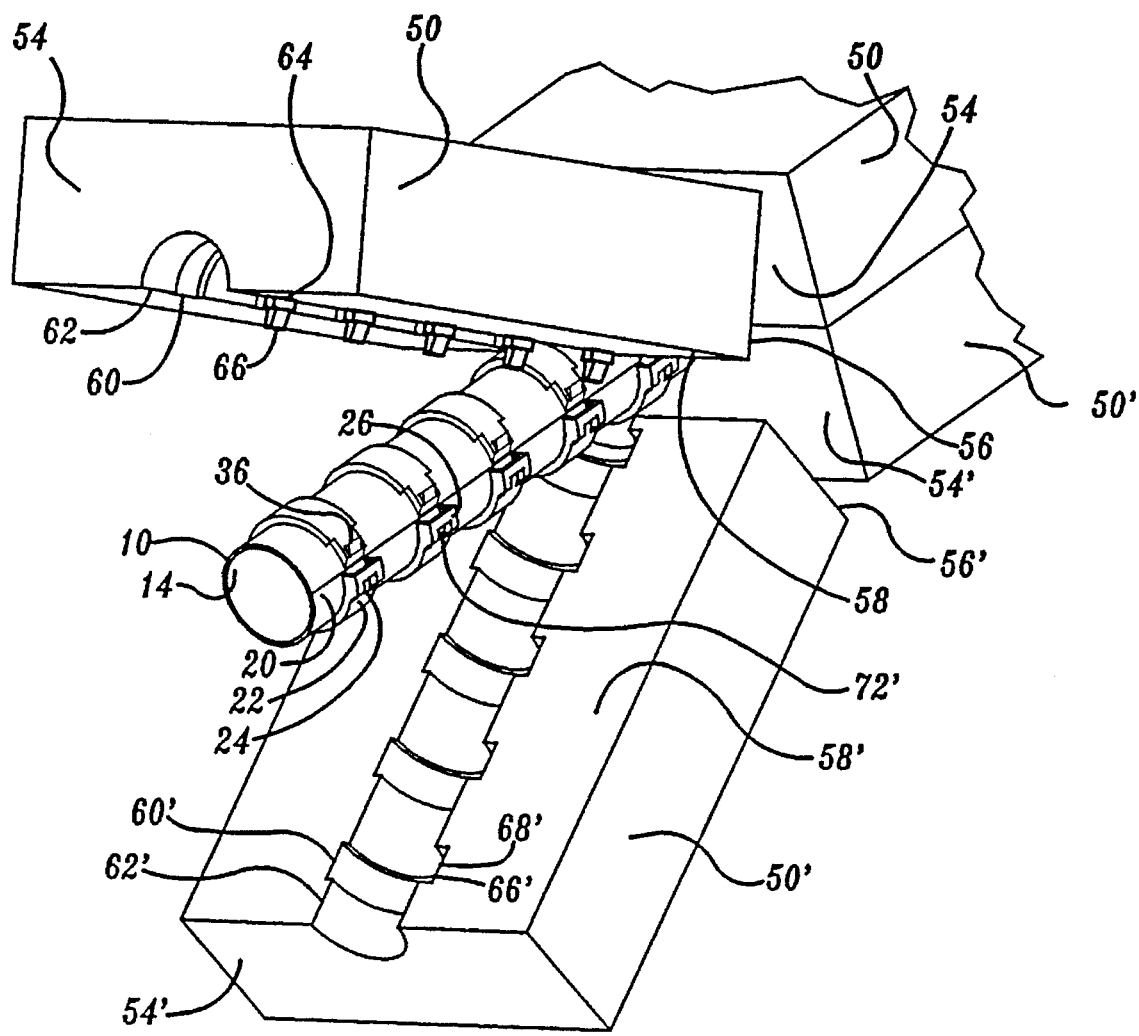
FIG. 1 is a perspective view of a first embodiment of a corrugated sleeve of the present invention shown exiting a first set of molding plates used to form a corrugated sleeve.
Figure 2:
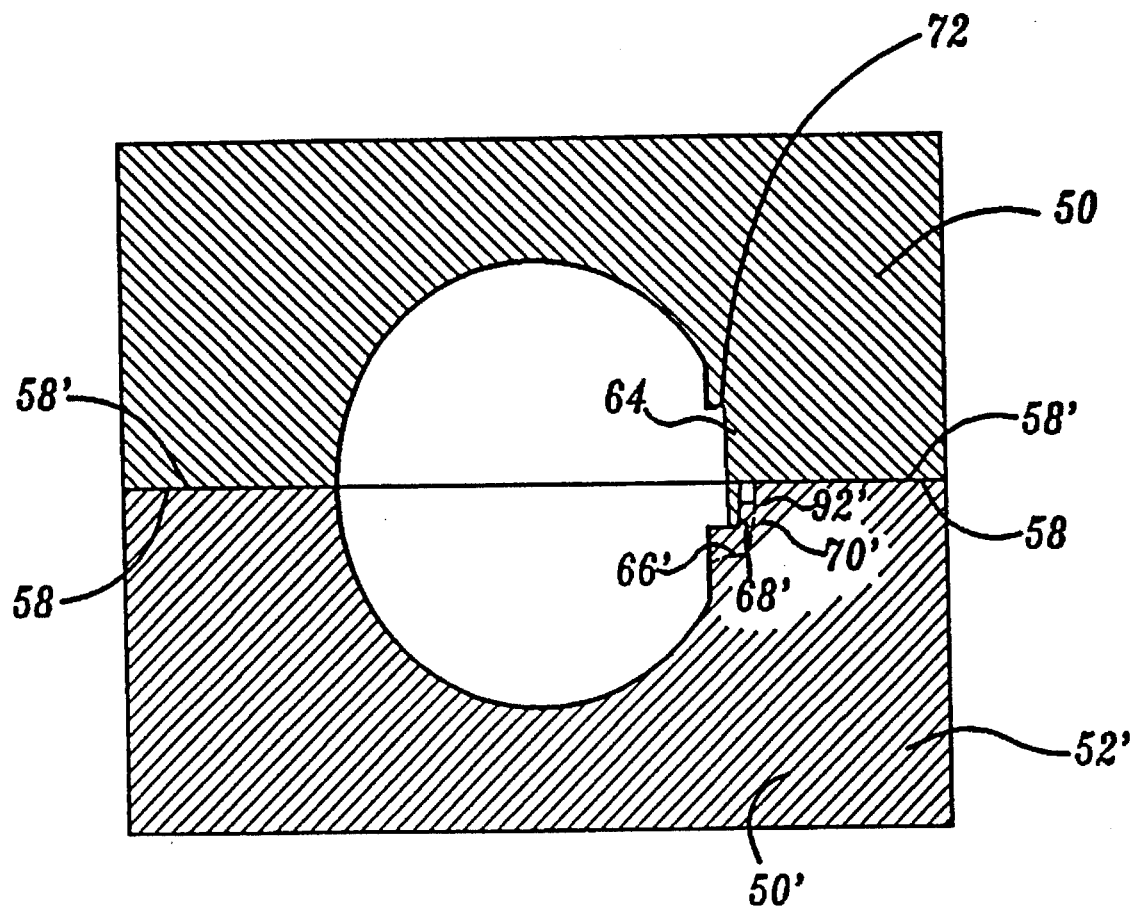
FIG. 2 is a partial cross-sectional view demonstrating the formation of the first embodiment of a corrugated sleeve within the molding plates.

Referring to FIGS. 1 and 2, the mold plates used in the process for manufacturing a first embodiment of the corrugated sleeve 10 of the present invention is shown at various stages of the manufacturing process. The corrugated sleeve 10 of the present invention is formed by positioning a single length of relatively round plastic tubing between a plurality of first and second mold plates, 50 and 50', respectively, arranged along a linear path and adjoining the mold plates for a specific amount of time. Since the first and second mold plates of the present have numerous similar features, like reference numerals will be employed to describe like features. The mold plates are typically rectangular in shape having relatively flat first and second ends 54, 56, 54' and 56'. A longitudinal cavity having sections of successive enlarged and reduced diameters, 60 and 62, and 60' and 62', respectively, is provided when the first and second mold plates are adjoined along their mating faces 58 and 58'. The first plurality of mold plates 50 are provided with a ledge portion 64 located below and substantially parallel to the level of the face 58 on each of the enlarged diameter sections 60. Disposed perpendicularly between the first plate's face 58 and the ledge portion 64 are a plurality of lugs 66 of plate 50 and recesses 68' of plate 50'. The second mold plates 50' include a plurality of mating lug and recess portions 66' and 68', respectively, disposed relatively perpendicular to the second plates face 58'. Gaps 72' are provided along the enlarged diameter sections 60 and 60' between the corresponding lugs and recesses of the first and second mold plates upon adjoining the corresponding first and second plates. The first mold plates 50 further include downwardly extending members 66 which extend to meet plate 50' and form the gaps 72'.

Figure 3:
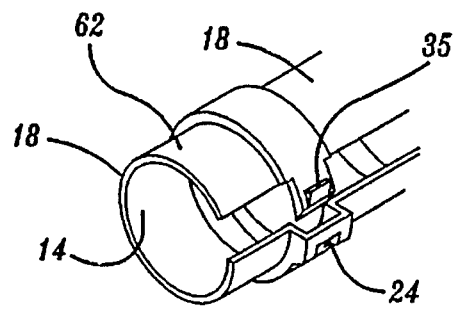
FIG. 3 is a perspective view demonstrating the corrugated tube produced by the molding plates of FIG. 1.
Figure 4:
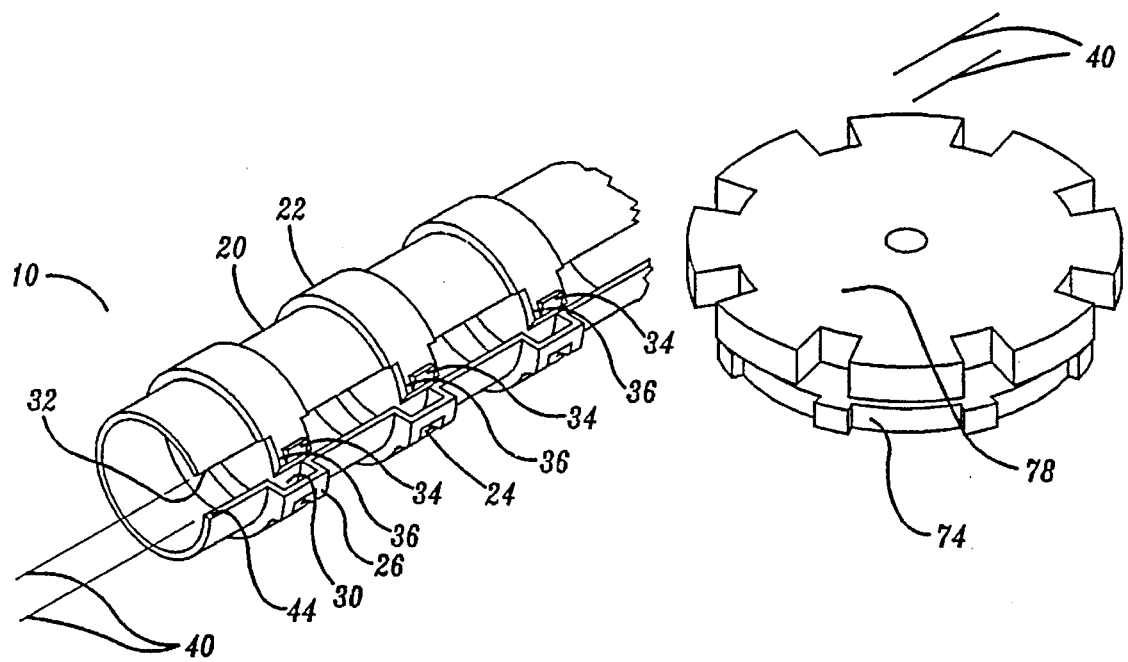
FIG. 4 is a perspective view demonstrating the formation of spaces on the reduced diameter portions along a longitudinal line.
Figure 5:
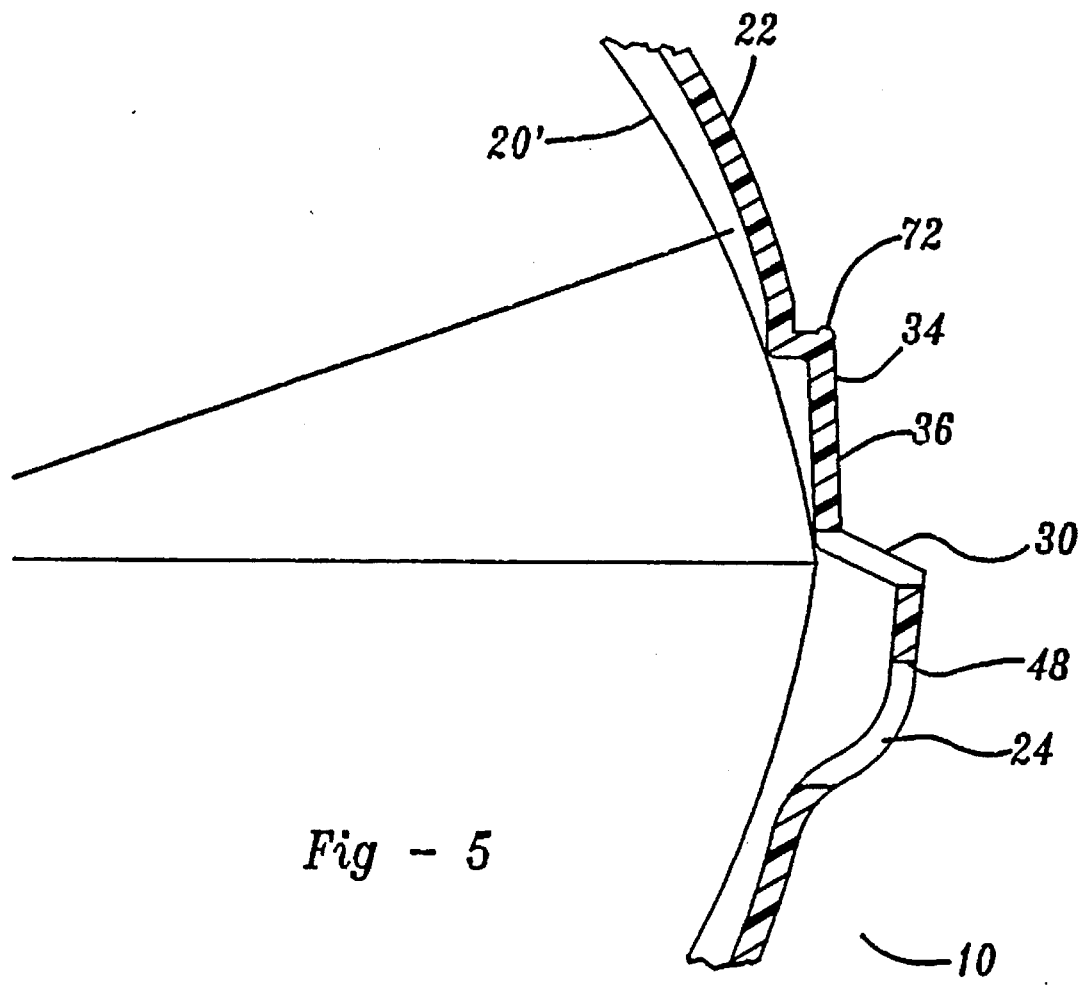
FIG. 5 is a partial cross-sectional view of the corrugated tube of FIGS. 3 and 4.

The plastic robing is then blow molded such that the plastic flows within the mold plates and becomes contoured according to the dimensions of the mold plates. The enlarged and reduced diameter portions are formed. The material around gaps 72' becomes filled by the displaced plastic to form the outward projections 22 contained on the outer surface 20 of the corrugated sleeve 10. While it is preferred that each enlarged diameter section be provided with an outwardly projecting tab member and a corresponding female outward projection, it will be understood that both the enlarged and reduced diameter sections could be provided with an outwardly projecting tab member and corresponding female outward projection. The outward projecting tab may be formed with a detenting area 72'. As demonstrated by the corrugated robe shown in FIG. 3, the reduced diameter portions 62 and 62' of the mold plates 50 and 50' provide the reduced diameter portions 18 of the robe with open spaces 24. In the alternative embodiment of tube 10 (FIG. 4), these open spaces 24 are cut into the corrugated tube 10 after the tube has been blow molded and a special cutting tool 74 has been used to remove material from the tube 10. A portion of plastic sleeve 10 is shown in FIG. 5.

Figure 6:
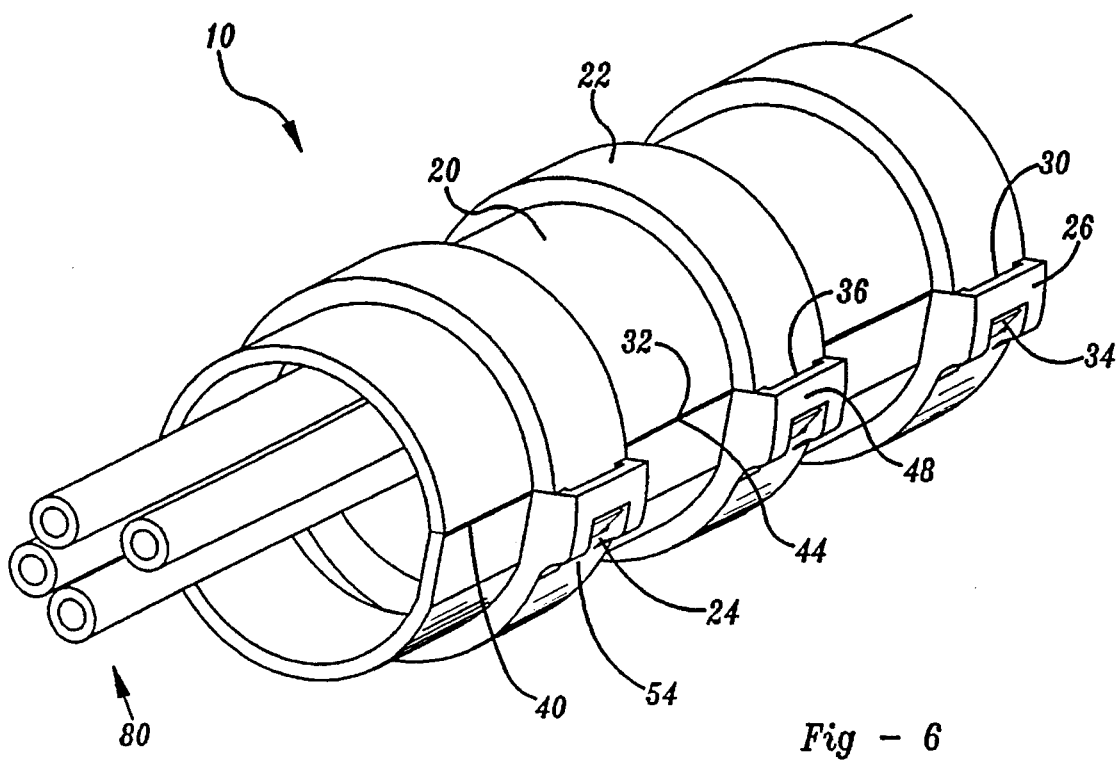
FIG. 6 is a partial cross-sectional view demonstrating the insertion of a male locking member into the corresponding female locking member.
Figure 7:
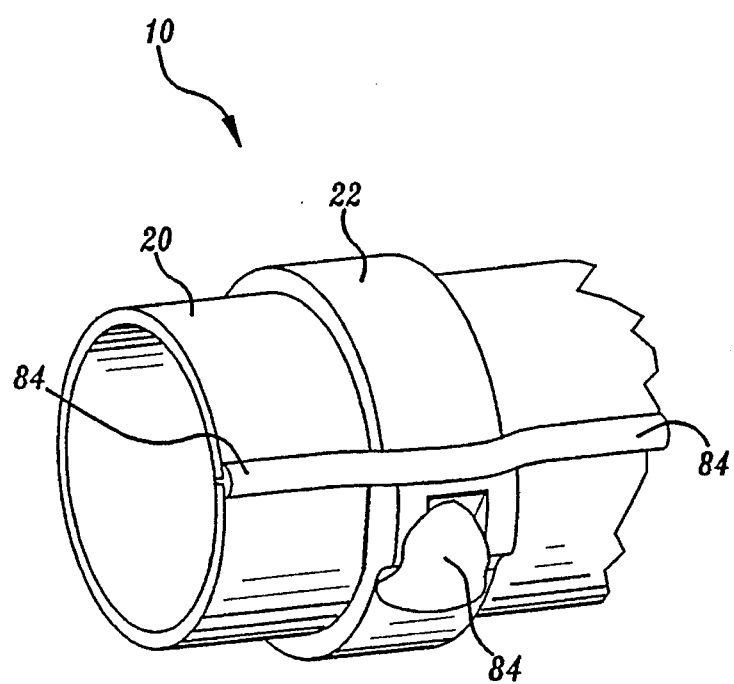
FIG. 7 is a partial cross-sectional view demonstrating the sealing together of the male and female locking portions.

Referring to FIGS. 6 and 7, the corrugated plastic sleeve 10 is slit along a longitudinal line 40 by a slitting tool 78 to form first and second longitudinal edges 32 and 44, respectively. The female locking members 26 are provided with a gap 24 and an aperture 30 to accommodate the projecting tabs 34 of the male locking members. The apertures 30 are formed by the cutting tool 78.

Once the conducting equipment 80 has been positioned within the corrugated sleeve 10 and has come to rest upon the inner surface 14, the male and female locking members can be adjoined to close the corrugated sleeve as shown in FIG. 6. The male locking members 36 are inserted into the aperture 30 of the corresponding female locking members 26. The male locking members 36 are advanced within the apertures 30 until the tab members 34 slide into the gaps 24. At this point, the top edge 35 of the projecting tabs 34 lock under the blocking wall 48 provided on the female locking member.

Referring to FIGS. 6 and 7, with the male locking members adjoined to the female locking members, additional sealing 84 can be accomplished by plastic welded to the outer surface of the male locking member. The tab members can also be plastic welded to the outwardly projecting portions to further secure the male and female locking members together.

While the above description constituted the preferred embodiments of the present invention, it will be appreciated that the invention is susceptible to modification, variation and change without departing from the proper scope and entire meaning of the accompanying claims. For example, it is contemplated that an adhesive can be utilized to permanently secure the male and female locking members together either with or in place of plastic welding.

I claim:

1. A corrugated sleeve for retaining conducting equipment such as cables, wiring, tubing and the like, comprising:

a sleeve formed of a single piece of plastic of generally tubular shape having a longitudinal portion which includes an inner surface, an outer surface, successive alternating enlarged and reduced diameter sections and means for joining a plurality of corresponding male and female locking members which are formed by slitting the sleeve;

said male locking members extending from said slit sleeve along a first longitudinal edge at said enlarged diameter sections, wherein a plurality of said male locking members are provided with an outwardly projecting tab including a locking top edge;

said female locking members extending along the enlarged diameter sections from the second longitudinal edge and having a shape to receive said male locking members, said female locking members having means to lock said male locking members including a blocking wall for precluding the undesired removal of the male locking members;

whereby said male locking members are adjoined to said corresponding female locking members by inserting said male locking members into said female locking members such that the locking top edge of the tabs snap under the blocking walls of the female member.

2. The corrugated sleeve of claim 1, wherein said means for retaining said male locking members include apertures.

3. The corrugated sleeve of claim 1, wherein said means for retaining said male locking members include detents.

4. The corrugated sleeve of claim 1, wherein said male and female locking members are permanently adjoined by adhering said male and female locking members together upon connection.

5. The corrugated sleeve of claim 4, wherein said male and female locking members are welded together.

6. The corrugated sleeve of claim 5, wherein said male and female locking members are glued together.

7. A method of making a corrugated sleeve useful for enclosing lengths of conducting equipment such as cables, wiring and tubing, comprising the steps of:

(a) providing a plurality of mating first and second mold plates which are joinable along mating surfaces having a cavity defined by successive enlarged and reduced diameter sections, said first and second mold plates including alternating lugs and lug receiving and locking areas wherein the first mold plate includes a ledge located below the mating surface along which said lug and lug receiving and locking areas are disposed;

(b) removing said corrugated sleeve from said mold plates and slitting said corrugated sleeve to form first and second longitudinal edges;

(c) providing a plurality of said diameter sections with an outwardly projecting male tab members; and (d) providing a corresponding number of outwardly projecting female locking members with means for retaining said male tab members.

8. The method of claim 7, wherein said means for retaining said tab members further comprise apertures.

9. The method of claim 7, wherein said means for retaining said tab members further comprise detents.

10. The method of claim 7, wherein said tab members are formed by punching out a portion of said diameter section proximate to said first longitudinal edge and cold bending outwardly said punched out portion.

11. A mold plate assembly for the production of a corrugated sleeve, comprising:

a plurality of first and second mold plates arranged along a linear path, each of which includes a body having a longitudinal cavity with successive sections of enlarged and reduced diameter and a surface for mating said first and second mold plates;

said first mold plates including a ledge located below the level of said mating surface and a plurality of lugs and recesses extending between said ledge and said mating surface; and said second mold plates including a projection which extends radially from said body which contains a plurality of lugs and recesses;

whereby upon aligning said mating surfaces, the lugs of the first and second mold plates become aligned with the corresponding recesses of the first and second mold plates such that male and female locking members can be formed along the sleeve.

12. The mold plate assembly of claim 11, wherein a gap is provided between said lugs of the first mold plates and the corresponding recesses of the second mold plates.

13. The first and second mold plates of claim 11, wherein said mold plates are formed of metal.

14. The first and second mold plates of claim 11, wherein said mold plates are formed of a ceramic material.

15. The mold plate assembly of claim 11, wherein said surfaces for mating are flat.

16. The mold plate assembly of claim 11, wherein said body has a generally rectangular shape.

17. The mold plate assembly of claim 11, wherein said corresponding first and second mold plates contain the same number of lugs and recesses.

18. The mold plate assembly of claim 11 wherein said lugs have a generally rectangular shape.

19. The mold plate assembly of claim 11, wherein said recesses have a generally rectangular shape.

20. A corrugated sleeve having alternating enlarged and reduced diameter sections for retaining conducting equipment such as cables, wiring, tubing and the like, comprising:

a sleeve formed of a single piece of plastic having a longitudinal portion which includes an inner surface, an outer surface, successive alternating enlarged and reduced diameter sections and means for joining a plurality of corresponding male and female locking members which are formed by slitting the sleeve along a longitudinal dividing line;

said male locking members extending from said body portion along a first longitudinal edge at said enlarged diameter sections, wherein a plurality of said male locking members are provided with an outwardly projecting tab;

said female locking members extending along the enlarged diameter sections from the second longitudinal edge and include gap means for receiving said male locking members; and means for retaining said tab members.

21. The corrugated sleeve of claim 20, wherein said means for retaining said tabs include apertures.

22. The corrugated sleeve of claim 20, wherein said means for retaining said tabs include detents.

23. The corrugated sleeve of claim 20, wherein said male and female locking members are permanently adjoined by adhering said male and female locking members together upon connection.

24. The corrugated sleeve of claim 23, wherein said male and female locking members are welded together.

25. The corrugated sleeve of claim 23, wherein said male and female locking members are glued together.

26. A method of making a corrugated sleeve having alternating enlarged and reduced diameter sections useful for enclosing lengths of conducting equipment such as cables, wiring and tubing, comprising the steps of:

(a) providing a plurality of mating first and second mold plates which are joinable along mating surfaces having a cavity defined by successive enlarged and reduced diameter sections, said first and second mold plates including alternating lugs and recesses and said first mold plate including a ledge located below the mating surface along which lug and lug receiving and locking areas are disposed;

(b) closing said first and second molds and blow molding a plastic material to form a corrugated sleeve having a plurality of enlarged and reduced diameter portions wherein said enlarged diameter portions include a plurality of outwardly projecting members;

(c) providing a plurality of said enlarged diameter sections with outwardly projecting tab members;

(d) providing a corresponding number of outwardly projecting female locking members with means for retaining said tab members; and (e) removing said corrugated sleeve from said mold plates and slitting said corrugated sleeve to form first and second longitudinal edges.

27. The method of claim 26, wherein said means for retaining said tab members further comprise apertures.

28. The method of claim 26, wherein said means for retaining said tab members further comprise detents.

29. The method of claim 26, which includes the step of providing locking means on said sleeve by removal of selected portions from said sleeve.

30. The method of claim 26 which includes the step of blow molding said sleeve within said mold plates.

* * * * *

UNITED STATES PATENT AND TRADEMARK OFFICE
CERTIFICATE OF CORRECTION

PATENT NO. : 5,566,722

DATED : October 22, 1996

INVENTOR(S) : Donald D. Bartholomew

It is certified that error appears in the above-indentified patent and that said Letters Patent is hereby corrected as shown below:

Col. 1, line 32, delete "with"

Col. 1, line 33, delete 2nd occurrence of "male" and substitute --female-- therefor Col. 2, line 20, "tubes" should be --tube's--

Col. 2, line 36, "make" should be --makes--

Col. 2, line 59, "portions;" should be --portions.--

Col. 3, line 6, after "present" insert --invention--

Col. 3, line 9, "fiat" should be --flat--

Col. 3, line 28, "robing" should be --tubing--

Col. 3, line 42, "robe" should be --tube--

Col. 3, line 44, "robe" should be --tube--

Col. 4, line 3, "welded" should be --welding--

Signed and Sealed this

First Day of April, 1997

Attest:

BRUCE LEHMAN

Attesting Officer

Commissioner of Patents and Trademarks